Nov. 12, 1935.    E. G. HALLQUIST    2,020,943
ANTISKID DEVICE
Filed April 13, 1934
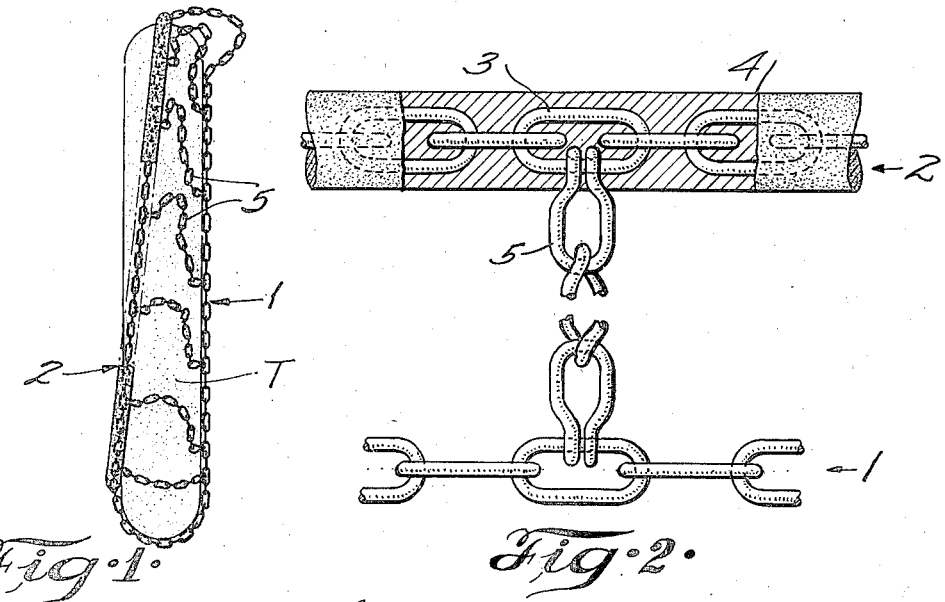
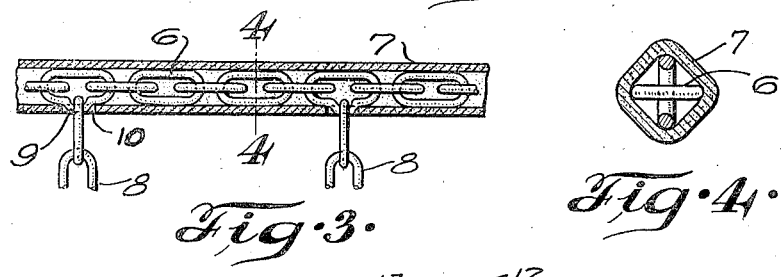
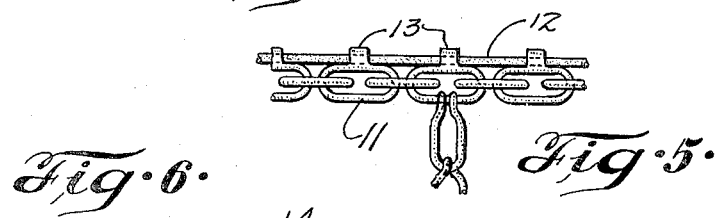
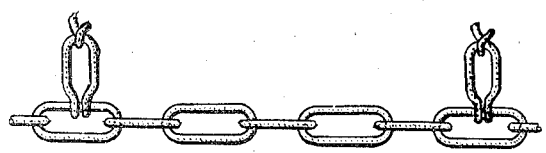
INVENTOR
Einar G. Hallquist
By Rodney Bedell
ATTORNEY Patented Nov. 12, 1935

2,020,943

UNITED STATES PATENT OFFICE 2,020,943

ANTISKID DEVICE

Einar G. Hallquist, Wallingford, Pa.

Application April 13, 1934, Serial No. 720,403

14 Claims. (Cl. 152—14)

The invention relates to anti-skid devices such as are generally used on pneumatic tires for motor vehicles, and the invention consists in a novel construction of such devices in which two endless side members are employed, one of which side members cannot be passed over the tire periphery and the other of which side members can be passed over the tire periphery.

The main object of the invention is to facilitate the application of the device to the tire and also to facilitate its removal therefrom whereby the anti-skid device may be manipulated from the outside face of the wheel, eliminating the necessity of hooking and unhooking the usual inner side chain on the rear face of the tire, access to which is difficult.

Additional objects of the invention are to eliminate excessive creeping or slipping of the device circumferentially of the wheel, to reduce the annoyance of noise accompanying many ordinary chain arrangements, and, by the use of at least one ordinary rigid chain, to avoid stretching of the device under heavy traction.

The usual anti-skid device comprises side chains each provided with hooks for securing the respective ends together, and everyone who has had experience in applying and removing such devices realizes the difficulty involved, particularly when the fasteners or hooks are encased in mud, ice, or are damaged so that their relatively movable parts are out of line or otherwise injured.

Recent designs of automobiles include fender wings or skirts approaching closer to and covering portions of the tire and increasing the difficulty of applying and removing the ordinary anti-skid chains.

In the accompanying drawing which illustrates the invention—

Figure 1 is an edge view of an ordinary pneumatic tire with the anti-skid device in the process of being applied thereto.

Figure 2 is a detail view of a relatively small part of the device, a part being sectioned to more clearly illustrate the interior construction.

Figure 3 is a detail view illustrating a modified form of the invention.

Figure 4 is a transverse section on the line 4—4 of Figure 3.

Figure 5 corresponds to Figure 3 and illustrates another modification of the invention.

Figure 6 corresponds to Figure 2 and illustrates another modification of the invention.

In the construction shown in Figures 1 and 2, one of the endless side members 1 is an ordinary rigid link chain, the maximum length being substantially less than the circumference of the tire T to which the device is applied, and this chain corresponds in length to the ordinary hook-ended anti-skid chain except that it can be slightly shorter than the ordinary chain because there is no necessity for the provision of sufficient slack to enable the user to manipulate the hook or other fastening mechanism for securing the two ends of the chain together.

The other side member 2 comprises a similar rigid link endless chain 3 which will have a maximum length substantially greater than chain 1, enabling it to be passed over the tire periphery when the device is applied to the latter, as indicated in Figure 1. Chain 3 is encased, preferably throughout its length, in a mass of rubber 4 which may be stretched longitudinally of member 2 to permit the links to assume the maximum length position indicated in Figure 1. Normally rubber 4 will contract the chain 3 so that the length of side member 2 approximates the length of side member 1, the links of chain 3 assuming the slackened position shown in Figure 2.

Suitable cross chains 5 connect the side members 1 and 2 in the usual manner and one end of each cross chain 5 is embedded in the rubber casing 4 and thereby held against sliding along the link of the side chain. The elastic construction of side member 2 will result in the elimination of slack in the cross chains and in both side members. This will tend to reduce or eliminate noise in the operation of the vehicle, due to clattering of the chains, and noise and damage due to the cross chains striking the fender because of excessive slack.

In Figures 3 and 4 the side chain 6 corresponds to chain 3 but the elastic or yielding feature is provided by a rubber tube 7 which encloses the chain 6. The links of chain 6 to which the cross chains 8 are attached include offset elements 9 projecting through spaced apertures 10 in tubing 7.

The side chain 11, illustrated in Figure 5, is not enclosed in a rubber casing or tubing but an elastic element such as the rubber or spring strip 12 is coextensive with chain 11 and is secured thereto at intervals by lugs or hooks 13 on the chain.

The arrangement shown in Figure 6 includes a plurality of springs 14 secured to spaced apart links 15 and 16 of the side chain 17. The number of spring elements 14 and the slack provided by the links 18 intermediate those to which the ends of the spring are attached will take care of the stretching and contraction of side chain 17 necessary to secure the same results as previously described.

All of the constructions described attain the general objects stated in the introductory portion of the specification and facilitate the application and removal of the device and insure the taut condition of the side members and the cross elements with the results indicated above.

The rigid links in each of the yielding side chains limit the stretching movement of these chains so that the rubber or spring elements cannot be stretched to their elastic limit and their elasticity impaired. While this definite limitation feature is desirable, it is to be understood that the entire yielding side member may be constructed of vulcanized rubber or spring elements and the metal chain core eliminated and other forms of side members can be substituted for those shown and other forms of yielding contracting members can be substituted for those shown without departing from the spirit of the invention. The exclusive use of such modifications of the invention as come within the scope of the claims is contemplated.

I claim:

1. In a vehicle tire anti-skid device, endless side members, ground engaging elements connecting said side members, one of said side members being of substantially fixed maximum length too short to be passed over the periphery of the tire to which the device is applied, the other of said side members being long enough to be so passed over the tire periphery, and means yieldingly limiting the length of said latter-mentioned member to substantially less than its maximum length.

2. In a vehicle tire anti-skid device, endless side members, and ground engaging elements connecting said side members, one of said side members being of substantially fixed maximum length too short to be passed over the periphery of the tire to which the device is applied, the other of said side members including yielding means normally limiting said latter-mentioned member under operating conditions to a length too short to be passed over the periphery of the tire, said means being stretchable manually to permit said latter-mentioned member to be passed from one side of the tire over its periphery to the other side thereof.

3. In a vehicle tire anti-skid device, endless side chains formed of rigid links, ground engaging elements connecting said chain, one of said chains being substantially longer than the other, and yielding means normally retracting said longer chain to a slackened condition in which it is substantially the same length as the shorter chain, said means being stretchable manually to permit the passage of the chain over the periphery of a tire to which the device is applied.

4. In a vehicle tire anti-skid device, endless side members, ground engaging elements connecting the same, one of said side members being too short to pass over the periphery of the tire to which the device is applied, and the other of said side members being long enough to be so passed over the tire, and yielding means extending lengthwise of said latter-mentioned side member for contracting it substantially uniformly throughout its length to shorten said latter-mentioned side member and hold the entire device in place.

5. In a vehicle tire anti-skid device, endless side members, ground engaging elements connecting the same, one of said side members being too short to pass over the periphery of the tire to which the device is applied, and the other of said side members being long enough to be so passed over the tire, and hollow rubber tubing enclosing said latter-mentioned side member and normally short enough to prevent its passage over the tire periphery but stretchable to permit such passage in applying the device to the tire and removing it therefrom.

6. In a vehicle tire anti-skid device, endless side members, one of said members having a maximum length too short to permit the passage of the member over the periphery of the tire to which the device is applied, the other of said side members having a maximum length accommodating such passage, a hollow rubber tubing enclosing said latter-mentioned side member and normally holding the latter contracted so that it will not pass over the tire periphery, said tubing being stretchable manually to permit such passage in applying the device to the tire and removing it therefrom, and anti-skid cross elements secured to said side members and extending through apertures in said tubing whereby said cross elements are positioned at substantially uniform intervals about the tire.

7. In a vehicle tire anti-skid device, side members and cross elements between the same, one of said side members being of substantially fixed maximum length but too short to pass over the periphery of the tire to which the device is applied and the other of said side members being substantially longer so that it may be passed over the tire periphery, said latter-mentioned member being encased in rubber which holds the member normally contracted so that it will not pass over the tire periphery.

8. In a vehicle tire anti-skid device, side chains and cross chains, at least one of said side chains comprising a series of rigid links and being of a maximum length long enough to be passed over the tire periphery, and a rubber enclosure for said links constructed to hold said side chains normally to a shorter length to meet operating conditions.

9. In a vehicle tire anti-skid device, endless side members, one of said members being too short to be passed over the periphery of the tire to which the device is applied and the other side member being of fixed maximum length great enough to permit its passage over the tire periphery, and a supplementary element paralleling said latter-mentioned side member and secured thereto at intervals throughout its length and yieldingly holding the latter-mentioned side member in contracted position to prevent its passage over the tire periphery.

10. In a vehicle tire anti-skid device, endless side chains, one of said chains being too short to be passed over the periphery of the tire to which the device is applied and the other side chain being of fixed maximum length great enough to permit its passage over the tire periphery, and a supplementary element paralleling said latter-mentioned side chain and secured to each alternate link of said latter-mentioned side chain and yieldingly holding the latter in contracted position to prevent its passage over the tire periphery.

11. In a vehicle tire anti-skid device, endless side members, one of said members being too short to be passed over the periphery of the tire to which the device is applied and the other side member having a fixed maximum length great enough to permit its passage over the tire periphery, and a supplementary element coextensive with said latter-mentioned side member and yieldingly holding the latter to a contracted length sufficiently less than said maximum length to prevent the passage of the side member over the tire periphery.

12. An anti-skid device for vehicle tires comprising side members and elements for extending across the tread of the tire, one of said side members being of yielding endless construction and adapted to be passed coaxially over the tire in applying the device thereto and to contract radially antomatically to maintain the device in position on the tire and the other of said side members being of unyielding endless construction and too short to be passed coaxially over the tire.

13. An anti-skid device for vehicle tires including endless side members, elements for extending across the tire tread between said members, one of said members being formed of rigid links relatively movable longitudinally of the member to extend the length of the latter, whereby it may be passed coaxially over the tire in applying the device thereto, and yielding means normally moving said links to contract the member so that it may function properly as a side member of the device when in operation.

14. In a vehicle tire anti-skid device, endless side members, ground engaging elements connecting said side members, one of said side members being of substantially fixed maximum length too short to be passed over the periphery of the tire to which the device is applied, the other of said side members being of substantially fixed maximum length barely sufficient to permit the member to be passed over the tire periphery, and yielding means normally contracting said latter-mentioned side member to the length of said first-mentioned side member.

EINAR G. HALLQUIST.